(12) United States Patent
Hoogerwerf et al.

(10) Patent No.: US 8,418,257 B2
(45) Date of Patent: Apr. 9, 2013

(54) COLLECTION USER INTERFACE (75) Inventors: Scott D. Hoogerwerf, Seattle, WA (US);
Lyon Wong, Issaquah, WA (US); Aaron W. Cardwell, Seattle, WA (US);
Michael J. Gilmore, Bothell, WA (US);
Rolf A. Ebeling, Kirkland, WA (US);
Manav Mishra, Kirkland, WA (US);
Jensen Harris, Bellevue, WA (US);
Kavitha Radhakrishnan, Redmond, WA (US); Benjamin J. Karas, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 244 days.

(21) Appl. No.: 12/947,289

(22) Filed: Nov. 16, 2010

(65) Prior Publication Data
US 2012/0124677 A1 May 17, 2012

(51) Int. Cl.
G06F 7/04 (2006.01)
(52) U.S. Cl. .............................. 726/26; 726/30; 726/32
(58) Field of Classification Search ................... 726/29, 726/26, 30, 32
See application file for complete search history.

(56) References Cited

U.S. PATENT DOCUMENTS

| | | | | |
|---|---|---|---|---|
| 6,407,752 B1 * | 6/2002 | Harnett | .......................... | 715/744 |
| 6,765,596 B2 * | 7/2004 | Lection et al. | ................. | 715/835 |
| 7,496,576 B2 | 2/2009 | Bernabeu-Auban et al. | | |
| 7,503,009 B2 | 3/2009 | Peters | | |
| 7,707,505 B1 * | 4/2010 | Ohrt et al. | ...................... | 715/738 |
| 2006/0190440 A1 | 8/2006 | Horvitz et al. | | |
| 2006/0242122 A1 | 10/2006 | DeVorchik et al. | | |
| 2008/0165132 A1 | 7/2008 | Weiss et al. | | |
| 2008/0313416 A1 | 12/2008 | Frondozo et al. | | |
| 2009/0158181 A1 | 6/2009 | Becerra, Sr. et al. | | |
| 2009/0166098 A1 | 7/2009 | Sunder | | |
| 2009/0282332 A1 * | 11/2009 | Porat | .............................. | 715/702 |
| 2009/0309847 A1 | 12/2009 | Russell et al. | | |
| 2010/0107085 A1 | 4/2010 | Chadwick et al. | | |
| 2010/0156818 A1 | 6/2010 | Burrough et al. | | |
| 2010/0262694 A1 | 10/2010 | Havemose | | |
| 2012/0304119 A1 | 11/2012 | Hoogerwerf et al. | | |

FOREIGN PATENT DOCUMENTS

JP 2011257990 12/2011

OTHER PUBLICATIONS

Petzold, Charles., "Exploring Multi-Touch Support in Silverlight", Retrieved at << http://msdn.microsoft.com/en-us/magazine/ee336026.aspx >>, Mar. 2010, pp. 12.
"IRTAKTIKS—Tactical RPG game for multitouch", Retrieved at << http://irtaktiks.codeplex.com/ >>, Version 13, Retrieved Date: Aug. 19, 2010, pp. 5.
Hansen, Thomas E "Multi-touch User Interfaces", Retrieved at << http://cs.uiowa.edu/~tehansen/quals.pdf >>, pp. 1-25.

(Continued)

*Primary Examiner* — Mohammad W Reza
(74) *Attorney, Agent, or Firm* — Wolfe-SBMC (57) ABSTRACT

Collection user interface techniques are described. In one or more implementations, a plurality of inputs are recognized as gestures received via interaction with a user interface to navigate through a file system of a computing device and select representations of objects managed by file system of the computing device, at least two of which are accessible via different devices. In response, copies of the representations are displayed by the computing device in a collection portion of the user interface. An option is output in conjunction with the collection portion by the computing device that is selectable to initiate a command to be performed using the objects that have corresponding representations included in the collection portion.

20 Claims, 9 Drawing Sheets

OTHER PUBLICATIONS

Andrews, et al., "MTVis: Tree Exploration Using a Multi-Touch Interface", Retrieved at << http://www.google.com/url?sa=t&source=web&cd=3&ved=0CCwQFjAC&url=http%3A%2F%2Fciteseerx.ist.psu.edu%2Fviewdoc%2Fdownload%3Fdoi%3D10.1.1.154.6333%26rep%3Drep1%26type%3Dpdf&ei=adxsTP6LC8yNjAe-tpn8CA&usg=AFQjCNGDIFjK6D0POxS8hywRC79p5sd7tg >>, Proceedings of SPIE—IS&T Electronic Imaging, Visualization and Data Analysis (VDA), vol. 7530, Jan. 2010, pp. 10.

"Browser Mode", Retrieved from: <http://www.linuxtopia.org/online_books/linux_desktop_guides/gnome_2.14_user_guide/nautilus-browser-mode.html> on Sep. 29, 2010, (Aug. 24, 2007),6 pages.

"Implementing Common Application Behaviors", Retrieved from: <http://developer.apple.com/library/ios/#documentation/iphone/conceptual/iphoneosprogrammingguide/StandardBehaviors/StandardBehaviors.html> on May 23, 2011,(Feb. 24, 2011),15 pages.

"Manage All of your Files Between Multiple Cloud Storage Accounts (Box.net and Dropbox), Local Files, iTunes File Sharing, and iWork.com", Retrieved from: <http://www.activecloud.pocketwatchllc.com/> on May 23, 2011,(2010),5 pages.

"Open Source Android Apps for Developers: OI File Manager", Retrieved from: <http://www.cuteandroid.com/open-source-android-apps-for-developers-oi-filemanager> on May 23, 2011,(Dec. 11, 2010),5 pages.

"Store and Read Files in Client's Computer Using Isolated Storage", Retrieved from: <http://www.silverlightexamples.net/post/Store-and-Read-Files-in-Clients-Computer-Using-Isolated-Storage.aspx> on May 23, 2011,(Jan. 10, 2008),3 pages.

"Writing to Disk", Retrieved from: <http://livedocs.adobe.com/flex/3/html/help.html?content=security_6.html> on May 23, 2011,2 pages.

Agarwal, Suprotim "Isolated Storage in Silverlight 2 Beta 2", Retrieved from: <http://www.dotnetcurry.com/ShowArticle.aspx?ID=168> on May 23, 2011,(Jul. 1, 2008),5 pages.

Bladh, Thomas et al., "The Effect of Animated Transitions on User Navigation in 3D Tree-Maps", *In Proceedings of IV 2005*, Available at: <http://citeseerx.ist.psu.edu/viewdoc/download?doi=10.1.1.119.8276&rep=rep1&type=pdf>,(Jul. 2005),pp. 1-9.

Daniel, Richard G., "File System Visualizer", Retrieved from: <http://fsv.sourceforge.net/> on Sep. 29, 2010, (Aug. 26, 2001),3 pages.

Glozic, Dejan et al., "Mark My Words", Retrieved from: <http://www.eclipse.org/articles/Article-Mark%20My%20Words/mark-my-words.html> on Sep. 29, 2010, (Apr. 1, 2001),5 pages.

Johnson, Steve "Managing Files and Folders in Windows 7", Retrieved from: <http://www.informit.com/articles/article.aspx?p=1393064&seqNum=20> on Sep. 29, 2010, (Sep. 10, 2009),3 pages.

"PCT Search Report and Written Opinion", Application No. PCT/US2011/055528, (May 3, 2012), 10 pages.

* cited by examiner

902
Display a plurality of copies of representations of objects in a collection portion of a user interface by a computing device, the copies collected using gestures to specify files from different locations in a namespace employed by the computing device and the display of the collection portion persisting during navigation of the namespace to locate the representations of the objects

904
Outputting in conjunction with the collection portion an option in the user interface by the computing device that is selectable to initiate a command to be performed using the objects that have representations included in the collection portion

*Fig. 9*

COLLECTION USER INTERFACE

BACKGROUND

The trustworthiness of applications may vary as greatly as the developers that code the applications. Users, for instance, traditionally obtained an application from a "big-box store" on a computer-readable storage medium (e.g., an optical disc) and took the medium home to install the application on a home computing device. Thus, the store as well as developers of applications that were provided to the store had a strong incentive that the applications worked as desired by the user and were thus trustworthy.

With the proliferation of availability of applications via the Internet, however, users may be exposed to a variety of applications having varying levels of trustworthiness. For example, the coding of the application may be flawed, may have been written by a malicious party, and so on. Therefore, traditional techniques that were employed to access a file system of a computing device may be compromised by these applications.

SUMMARY

Collection user interface techniques are described. In one or more implementations, a plurality of inputs are recognized as gestures received via interaction with a user interface to navigate through a file system of a computing device and select representations of objects managed by file system of the computing device, at least two of which are accessible via different devices. In response, copies of the representations are displayed by the computing device in a collection portion of the user interface. An option is output in conjunction with the collection portion by the computing device that is selectable to initiate a command to be performed using the objects that have corresponding representations included in the collection portion.

In one or more implementations, a plurality of copies of representations of objects is displayed in a collection portion of a user interface by a computing device. The copies are collected using gestures to specify objects from different locations in a namespace employed by the computing device. Additionally, the display of the collection portion persists during navigation of the namespace to locate the representations of the objects. An option is output in conjunction with the collection portion in the user interface by the computing device that is selectable to initiate a command to be performed using the objects that have representations included in the collection portion.

In one or more implementations, a first input is recognized as a first gesture to select a first representation of a first file displayed in a user interface by a computing device. In response to the recognition of the first gesture, a copy of the first representation is displayed in a collection portion in the user interface. A second input is recognized as a second gesture to select a second representation of a second file displayed in the user interface by the computing device. The first and second objects are accessible via different locations in a namespace employed by the computing device. In response to the recognition of the second gesture, a copy of the second representation is displayed in the collection portion in the user interface along with the copy of the first representation. An option is output in conjunction with the collection portion that is selectable to initiate a command to be performed using the first and second objects.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

As previously described, the trustworthiness of applications may vary as greatly as the developers that code the applications. Users, for example, may access an application marketplace via the Internet that provides hundreds and even thousands of applications for download. Because of the vast number of applications that are available, however, as well as due to the wide range of developers that may provide them, trustworthiness of the applications may vary greatly.

Collection user interface techniques are described. In one or more implementations, a user interface is provided to allow a user to verify access to a file system requested by an application. Thus, the application is not given direct access to the file system (e.g., a namespace employed by the computing device) in this example and thus has a reduced likelihood of compromising the computing device. The user interface that is employed by the computing device to manage access to the file system may employ a variety of techniques to aide navigation through the file system.

For example, the user interface may provide a mechanism to make multiple selections of files in the user interface. The user interface, for instance, may employ a collection portion that is configured to collect files from different locations in the file system, e.g., different locations in a namespace, from different devices accessible via the file system, and so on. An option may then be provided to initiate a command to be applied to files represented in the collection portion, which may involve providing the files to an application that requested access to the files. A variety of techniques may be employed by the collection user interface, further discussion of which may be found in relation to the following sections.

In the following discussion, an example environment is first described that is operable to perform techniques described herein. Examples procedures are then described, which are operable in the example environment as well as in other environments. Likewise, the example environment is not limited to performance of the example procedures. Although the following discussion describes collection user interface techniques employed for file management, these user interface techniques may be employed by a variety of different user interfaces without departing from the spirit and scope thereof.

Example Environment

Figure 1:
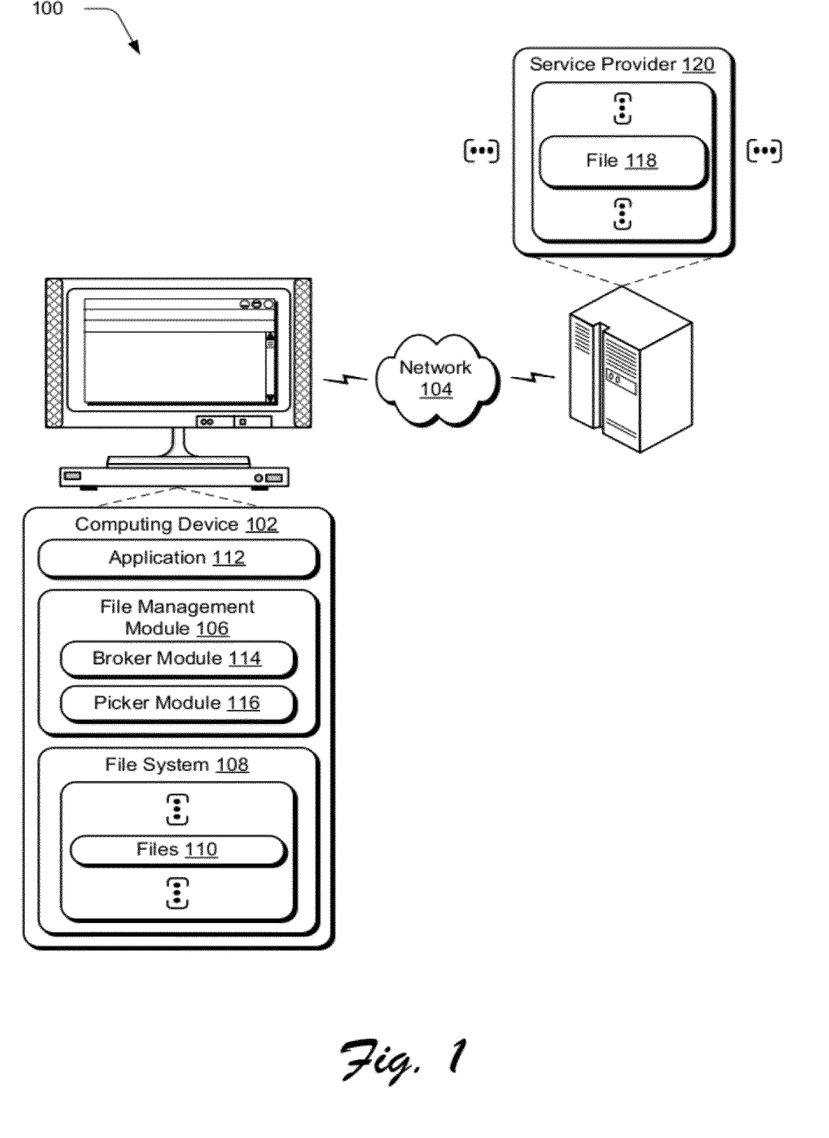
FIG. 1 is an illustration of an environment in an example implementation that is operable to perform techniques described herein.

FIG. 1 is an illustration of an environment 100 in an example implementation that is operable to employ file system access and other techniques described herein. The illustrated environment 100 includes a computing device 102, which may be configured in a variety of ways. For example, the computing device 102 may be configured as a computer that is capable of communicating over a network 104, such as a desktop computer, a mobile station, an entertainment appliance, a set-top box communicatively coupled to a display device, a wireless phone, a game console, and so forth.

The computing device 102 may range from full resource devices with substantial memory and processor resources (e.g., personal computers, game consoles) to a low-resource device with limited memory and/or processing resources (e.g., traditional set-top boxes, hand-held game consoles). Additionally, although a single computing device 102 is shown, the computing device 102 may be representative of a plurality of different devices, such as multiple servers utilized by a business to perform operations, a remote control and set-top box combination, an image capture device (e.g., camera) and a game console configured to capture gestures, and so on.

The computing device 102 may also include an entity (e.g., software) that causes hardware of the computing device 102 to perform operations, e.g., configures processors, functional blocks, and so on. For example, the computing device 102 may include a computer-readable medium that may be configured to maintain instructions that cause the computing device, and more particularly hardware of the computing device 102 to perform operations. Thus, the instructions function to configure the hardware to perform the operations and in this way result in transformation of the hardware to perform the operations. The instructions may be provided by the computer-readable medium to the computing device 102 through a variety of different configurations.

One such configuration of a computer-readable medium is signal bearing medium and thus is configured to transmit the instructions (e.g., as a carrier wave) to the hardware of the computing device, such as via the network 104. The computer-readable medium may also be configured as a computer-readable storage medium and thus is not a signal bearing medium. Examples of a computer-readable storage medium include a random-access memory (RAM), read-only memory (ROM), optical discs, flash memory, hard disk memory, and other memory devices that may use magnetic, optical, and other techniques to store instructions and other data.

Although the network 104 is illustrated as the Internet, the network may assume a wide variety of configurations. For example, the network 104 may include a wide area network (WAN), a local area network (LAN), a wireless network, a public telephone network, an intranet, and so on. Further, although a single network 104 is shown, the network 104 may be configured to include multiple networks.

The computing device 102 is illustrated as including a file management module 106. The file management module 106 is representative of functionality to manage a file system 108. The file management module 106 may be implemented in a variety of ways, such as a stand-alone application, as part of an operating system of the computing device 102, and so on.

The file system 108 employs techniques to organize and store files 110 by the computing device 102. The file system 108, for instance, may employ a hierarchy of folders to manage files 110 (e.g., executable and/or library files) in storage. The file system 108 may also employ a namespace, which provides techniques to manage a context in which the files 110 may be organized using abstractions, further discussion of which may be found in relation to FIG. 3. A variety of other file management techniques that may be employed by the file management module 106 and file system 108 are contemplated.

Additionally, a variety of different files 110 may be managed using the file management module 106. For example, the files 110 may be configured as library files. Library files generally refer to a unit of data that is referenced by another file that executes on the computing device 102, such as an application 112. Thus, the application 112 is an executable file that may access a library file to process the data contained therein. Accordingly, a library file may assume a variety of configurations, such as a document, plug-in, script, and so forth. Likewise, the application 112 may also assume a variety of configurations, such as a word processor, spreadsheet application, browser, and so on.

The file management module 106 is further illustrated as including a broker module 114 and a picker module 116. The broker module 114 is representative of functionality of the file management module 106 to manage access of the application 112 to the file system 108. The broker module 114, for instance, may act as an intermediary to locate files 110 requested by the application 112 and provide the files 110 back to the application 112. Further, the files 110 may be provided without the application 112 "knowing" from where the files 110 were obtained, e.g., with the application 112 being aware of the namespace used by the file system 108.

Additionally, the file management module 106 may employ the picker module 116 to configure a user interface such that a user may verify that access to the file system 108 is to be granted. In this way, the picker module 116 may allow a user to verify that the application 112 is accessing files as intended, further discussion of which may be found in relation to FIG. 2. Further, although access to files 110 that are local to the computing device 102 is described, the file management module 106 may manage the file system 108 to control access to remote files 118 that are accessible via a service provider 120 over the network (e.g., implemented using one or more computing devices), peripheral devices that are communicatively coupled to the computing device 102, and so on as further described in relation to FIG. 3.

Generally, any of the functions described herein can be implemented using software, firmware, hardware (e.g., fixed logic circuitry), manual processing, or a combination of these implementations. The terms "module" and "functionality" as used herein generally represent hardware, software, firmware, or a combination thereof. In the case of a software implementation, the module, functionality, or logic represents instructions and hardware that performs operations specified by the hardware, e.g., one or more processors and/or functional blocks.

Figure 2:
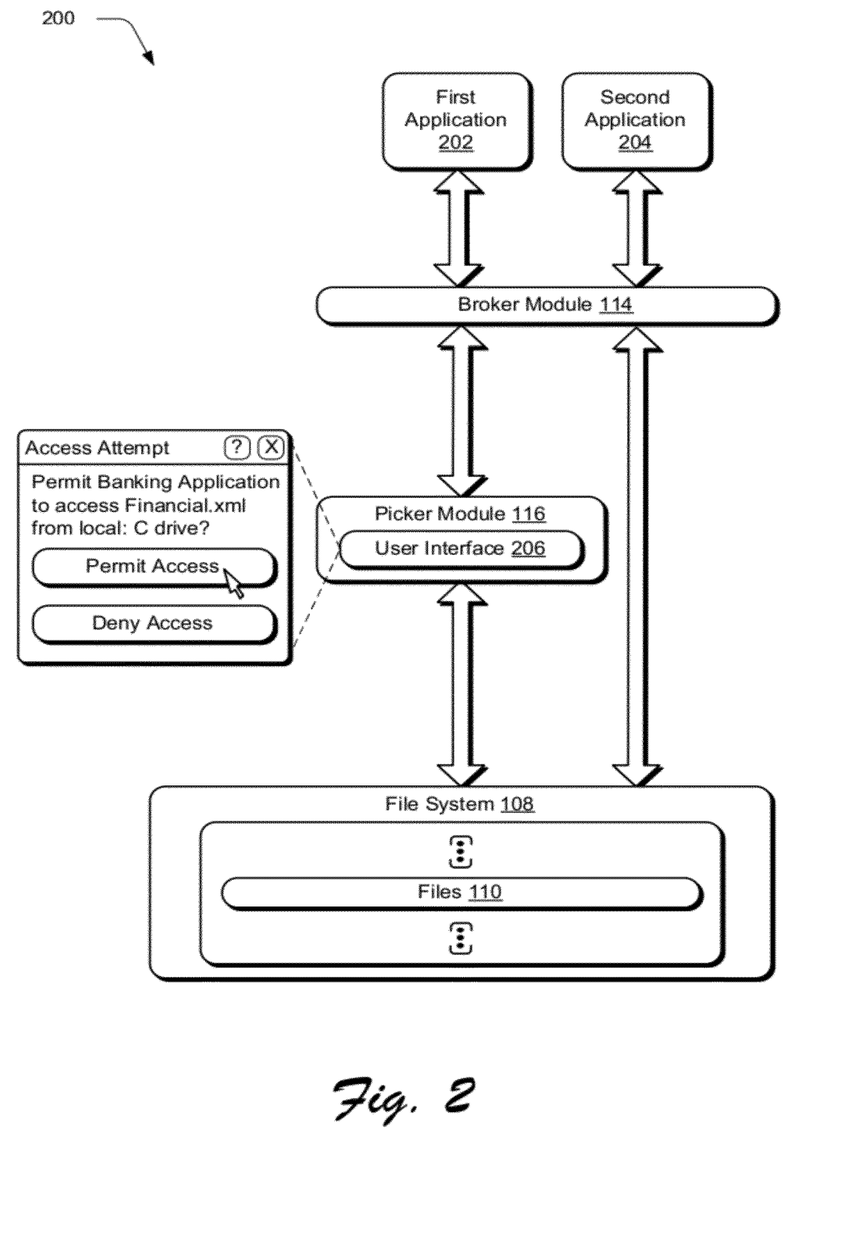
FIG. 2 is an illustration of a system in an example implementation configured to perform file management.

FIG. 2 is an illustration of a system 200 in an example implementation configured to perform file management. The system 200 as illustrated may be implemented by the file management module 106 of the computing device 102 to perform file management techniques. For example, the file management module 106 may be incorporated as part of an operating system, an application that executes in conjunction with the operating system, a stand-alone application, and so on. Regardless of where incorporated, the file management module 106 may employ techniques to manage files 110, 118 accessible to the computing device 102 locally and/or remotely via the network 104, e.g., from the service provider 120.

The system 200 as illustrated includes a first application 202 and a second application 204, which may or may not correspond to the application 112 described in relation to FIG. 1. In this example, both the first and second applications 202, 204 communicate with the broker module 114 via one or more application programming interfaces to access the file system 108.

In the case of the second application 204, a determination has been made that access to the file system 108 is trusted or in other words, the second application 204 is trustworthy. For example, the second application 204 may be coded by a reputable software provider, tested for compatibility, and so on. Accordingly, the second application 204 may be permitted by the broker module 114 to access the file system 108 without verification by the picker module 116.

In one implementation, this access is permitted without the second application 204 "knowing" where and/or how particular files 110 are arranged in the file system 108. The second application 204, for instance, may be unaware of a namespace used to access the files 110 in the file system 108. Therefore, the broker module 114 may convert requests from the second application 204 received via the API into a form that is understandable to locate files 110 of interest. In this way, the broker module 114 may still protect and manage access granted to the second application 204.

In another implementation, the second application 204 may be made aware of where and/or how the files 110 are arranged and located within the file system 108. For instance, the second application 204 may be configured to use a namespace supported by the file system 108 such that conversion of the request is not performed by the broker module 114. A variety of other examples are also contemplated, such as to enable direct access to the file system 108 without interacting with the broker module 114 to fully-trusted applications.

In the case of the first application 202 in the example illustrated in FIG. 2, a determination may be made that access to the file system 108 is not trusted, e.g., partially trusted or not permitted whatsoever. In response, the broker module 114 may employ the picker module 116 to verify access to the file system 108 that is requested by the first application 202. The first application 202, for instance, may communicate a request via one or more APIs to the broker module 114 to access the file system 108.

The broker module 114, upon receiving this request, may implement the picker module 116 to generate a user interface 206. The user interface 206 in this example is shown as a portion that includes a description of what access is being requested and "what" is requesting the access, e.g., identify the first application 202. The user interface 206 is also illustrated as including an option (e.g., "permit access" button) that is selectable to permit the requested access. An option to deny the access (e.g., "Deny Access" button) is also included in the user interface 206. Information within the portion of the user interface 206 may be output such that the first application 202 is not aware of what is contained therein and therefore is not made aware of a location of the requested data.

If the user selects the option to permit access (e.g., which is illustrated as selecting the Permit Access button using a cursor control device), the picker module 116 may permit access to the requested file 110. A variety of different types of access may be managed by the broker and picker modules 114, 116, singly or in combination. Examples of such access include saving a file 110, opening a file 110, modifying a file 110, moving files 110, and so forth.

The picker module 116 may be configured to provide access to the files 110 via the broker module 114 to the first application 202 in a way such that the first application 202 is unaware of a namespace used by the file system 108 to manage the files 110. Thus, the picker module 116 may protect the file system 108 from access by untrustworthy applications by confirming this access via the user interface 206. Examples of different configurations of user interfaces that may be used to interact with the file system 108 may be found in relation to FIGS. 4-7.

In one or more implementations, the broker module 114 may oversee a plurality of picker modules 116, each configured for a respective one of a plurality of applications. Thus, the broker module 114 and the picker module 116 may provide techniques to manage access to the files 110 by the first and second applications 202, 204 while reducing a likelihood that the execution of the applications may compromise the computing device 102 and/or other computing devices, e.g., one or more computing devices that implement the service provider 120 of FIG. 1.

Figure 3:
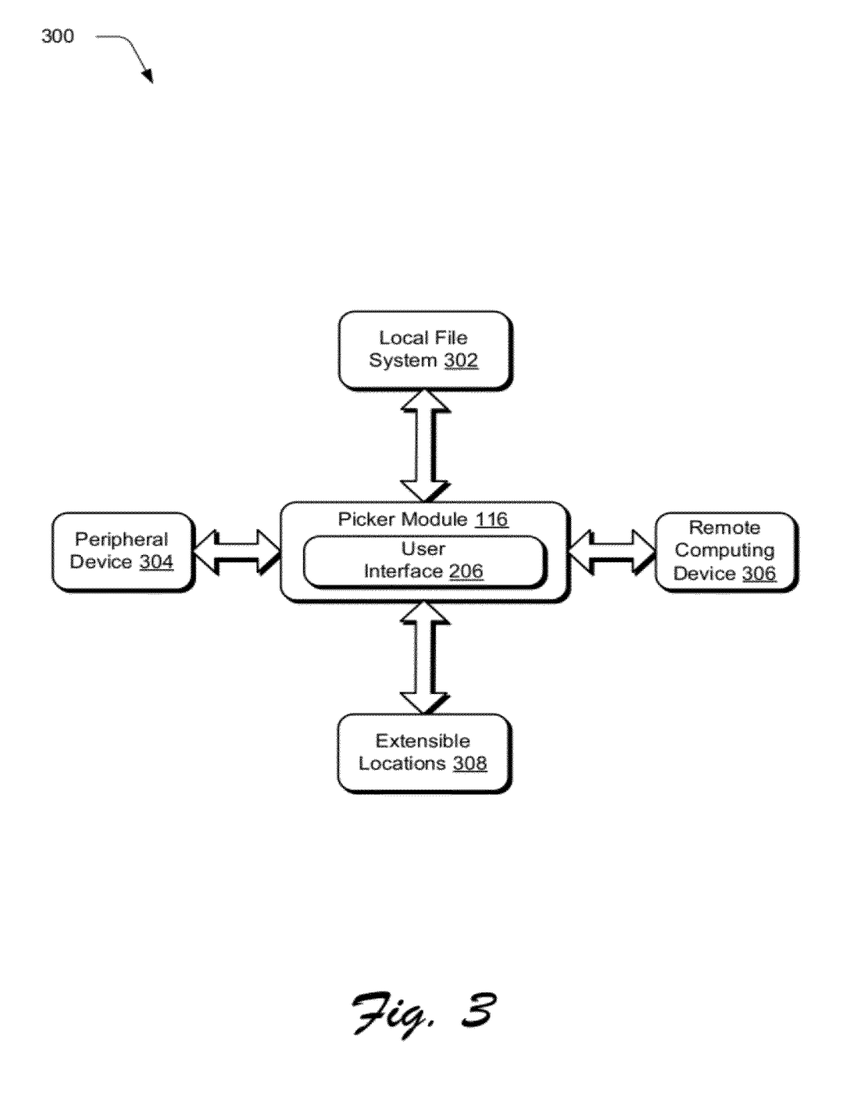
FIG. 3 is an illustration of a system in an example implementation in which a user interface is configured to access files from a variety of locations that are accessible via a namespace employed by a computing device of FIG. 1.

FIG. 3 is an illustration of a system 300 in an example implementation in which a user interface is configured to access files from a variety of locations that are accessible via a namespace employed by the computing device of FIG. 1. In this example, the picker module 116 is illustrated as including a user interface 206 that may be used to access a variety of different devices and locations within the file system 108, which may include file systems of other devices that are accessible via the computing device 102, such as file systems of hard disk drives. A variety of different techniques may be utilized by the file system 108 to organize and manage files, an example of which is a namespace.

A namespace may be utilized to organize the file system 108 into a tree-structured hierarchy. Folders in the hierarchy may represent the nodes of the tree and act as containers for files and other folders, whereas files are the leaves of the tree.

The namespace may be used to manage and provide access to a wide variety of files and other objects employed by the computing system 102. Examples of such objects include folders and files which are stored on computer-readable storage devices in a local file system 302 as well as other objects, such as peripheral device 304 communicatively coupled to the computing device 102, remote computing devices 306, and other extensible locations 308 such as control panel applications (e.g., executable files) of an operating system of the computing device 102, and so on.

The namespace may be used to manage these different objects in a variety of different ways, such as through links, managing physical storage of files 108, and so forth. Examples of user interfaces that may be used to interact with the namespace may be found in relation to the following section.

Example User Interfaces

The following section describes example user interfaces that may be implemented utilizing the previously described systems and devices. The computing device 102, for instance, may output the user interface 206 through execution of instructions on hardware of the computing device 102, e.g., one or more processors and/or functional blocks that are configured to perform operations by the instructions. Although these techniques are described for output by the user interface 206 of the picker module 116, these techniques may be employed by a wide variety of different user interfaces without departing from the spirit and scope thereof.

Figure 4:
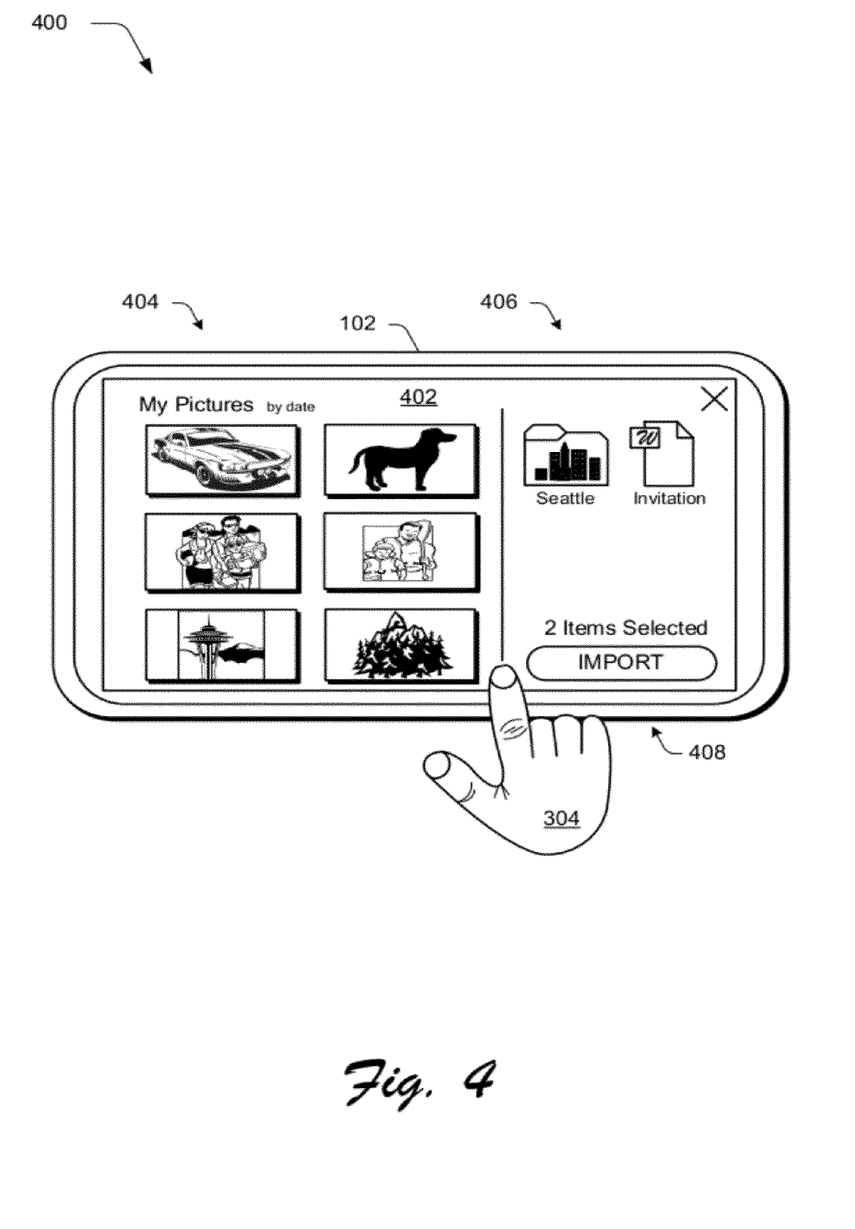
FIG. 4 depicts an example implementation of the computing device of FIG. 1 configured as a mobile communication device and as outputting a user interface having visual affordances that are configured to aid access to a file system.

FIG. 4 depicts an example implementation 400 of the computing device 102 of FIG. 1 configured as a mobile communication device and as outputting a user interface 402 having visual affordances that are configured to aid access to the file system 108. The user interface 402, as previously described, may be output to provide access to files 110 in the file system 108. Accordingly, the user interface 402 may be configured to support navigation through the file system 108 in response to user inputs such that the user may manage how this access is performed.

The user interface 402 in this example is illustrated as including a portion 404 that displays representations of files and other objects managed by the file system 108. In the illustrated examples, representations of image files are displayed in a "My Pictures" folder in a file hierarchy arranged using a namespace. The representations in this example are illustrated as thumbnails, although a variety of other representations are also contemplated, such as text and so on. Thus, this portion of the user interface 404 may be used to navigate through the file system 108 to locate and arrange files and other objects.

The user interface 402 is also displayed as including a collection portion 406. The collection portion 406 is configured to enable a user of the computing device 102 to collect representations of files and other objects from various locations in the file system 108 as discussed in relation to FIG. 2. In the illustrated example, the collection portion 406 includes a representation of a folder "Seattle" that includes images and a representation of a document "Invitation."

The collection portion 406 may be configured to include dynamic information. An example of this is illustrated by the "2 items selected" text that specifies a number of files and other objects included in the collection portion 406. Other dynamic information is also contemplated, such as an indication of "where" in the file system 108 the files and other objects are located, metadata that describes the objects, and so forth.

Additionally, the collection portion 406 may include an option 408 to initiate a command to be performed using the files and other objects represented in the collection portion 406. For example, the picker module 116 may use functionality to determine which commands are relevant to objects included in the collection portion 406 and include representations of those commands that are selectable to initiate the command. In another example, the command may be specified by the application 112, i.e., the type of access desired, and the picker module 116 may represent this option 408 in the user interface 402. Selection of the option 408 may thus be used to verify that this access is to be permitted to the application as previously described in relation to FIG. 2.

Thus, the user interface 402 may be output in response to a variety of factors. For example, the broker module 114 may receive a request from the application 112 to access the file system 108. In response, the broker module 114 may output the user interface 402. A variety of other examples are also contemplated. Accordingly, the collection portion 406 of the user interface 402 may be displayed when functionality of the portion is desired, but removed from the user interface when this functionality is not desired such that the user interface 402 is not cluttered. Representations of files and other objects may be included in the collection portion 406 in a variety of ways, an example of which may be found in relation to the following figure.

Figure 5:
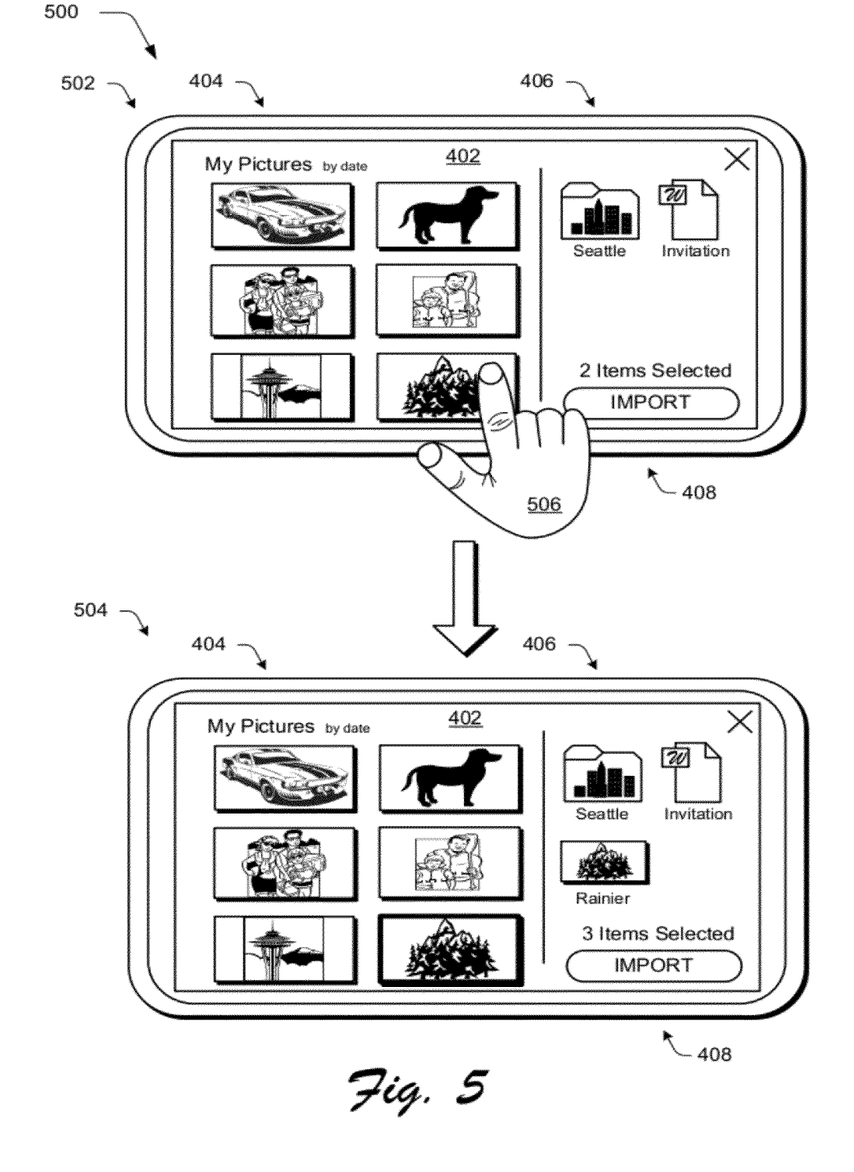
FIG. 5 depicts an example implementation in which a user interface of FIG. 4 is navigated to select representations of files to be copied to the collection portion using a gesture.

FIG. 5 depicts an example implementation 500 in which the user interface 502 of FIG. 4 is navigated to select representations of files to be copied to the collection portion using a gesture. The example implementation 500 is illustrated in FIG. 5 using first and second stages 502, 504. At the first stage 502, the user interface 402 is illustrated as described in relation to FIG. 4, having a portion 404 to access the file system 108 and a collection portion 406. A finger of a user's hand 506 is illustrated as selecting a representation of an image file of a mountain in the portion 404 that represents files and other objects in the file system 108. The representation may be selected in a variety of ways using a variety of different gestures, such as a "tap," a "tap and drag" to move the representation over to the collection portion 406, and so on.

The second stage 504 illustrates an example result of the gesture of the first stage 502. A copy of the representation is displayed in the collection portion 406. Additionally, the dynamic information included in the collection portion 406 is updated to reflect that three items are currently selected in the collection portion 406.

Further, the representation that was copied is indicated as such in the portion 404 that is configured to interact with the file system 108. In this example, a border of the representation is illustrated as shadowed and outlined, although a variety of other display characteristics may be altered to provide this indication, such as color, use of an animation, highlighting, underlining, and so on. Thus, a user navigating through the file system 108 using the portion 404 may readily determine which files and other objects are already included in the collection portion 406.

A single selection of the option 408 may then cause a command to be performed on the collection, such as to import the files and objects as illustrated to the application 112. A variety of other commands are also contemplated, such as open, save, upload, send, and so on. The collection portion may be configured to provide a variety of different visual affordances to aide interaction, an example of which is discussed in relation to the following figure.

Figure 6:
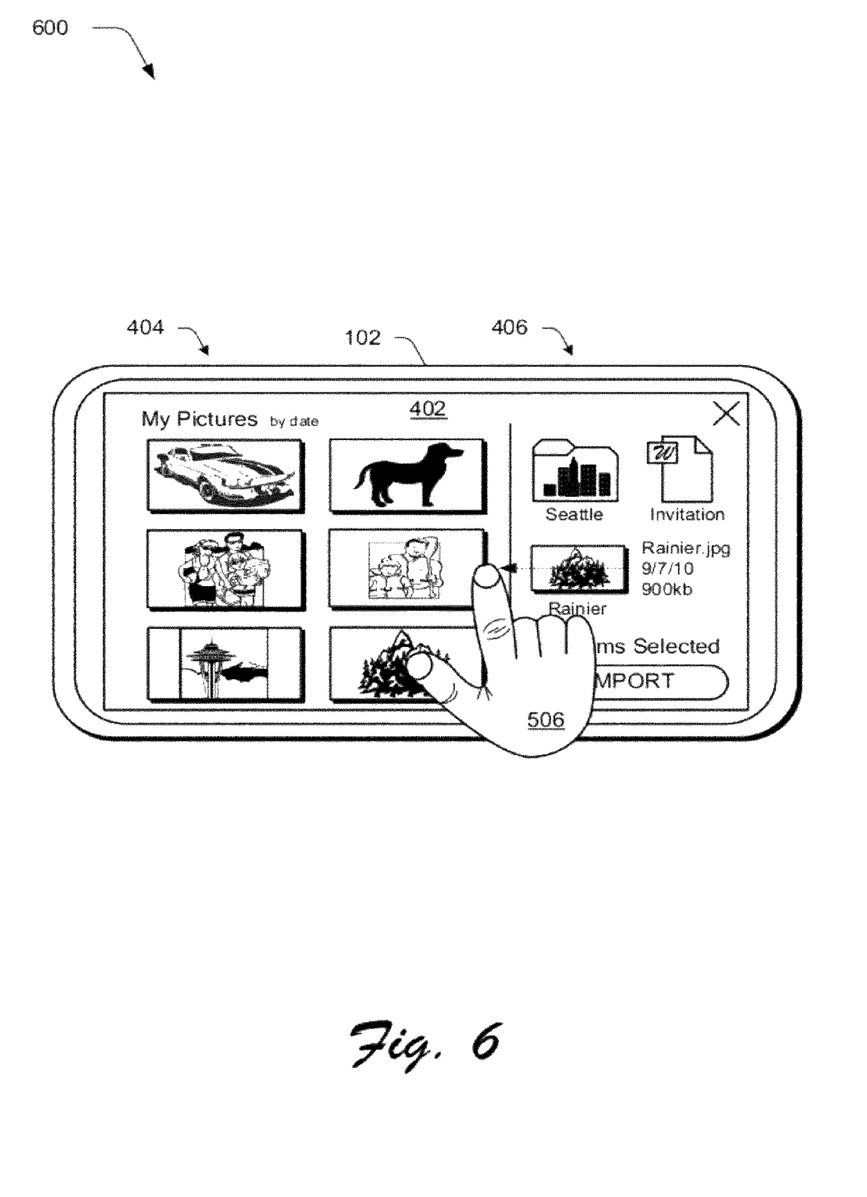
FIG. 6 is an illustration of an example implementation of a user interface of FIG. 5 as employing functionality to further describe files and other objects represented in the collection portion.

FIG. 6 depicts an example implementation 600 of the user interface of FIG. 5 as employing functionality to further describe files and other objects represented in the collection portion 406. In this example, the collection portion 406 supports a gesture to determine properties of a represented file in the user interface 402. A finger of a user's hand 506, for instance, may be swiped over a display of a representation of a file (e.g., "Rainier") to cause an output of properties of the file in the user interface 402. For instance, the computing device 102 may detect that the finger of the user's hand 506 was placed outside of a representation of the file or other object and moved "through" the display such as to cross at least two boundaries of the displayed representation.

A variety of different properties of the represented file may be described such as name, type, date, and size as illustrated as well as a variety of other properties such date modified, date accessed, and so on. In an implementation, the output of the portion 306 may be performed "just-in-time" upon detection of the gesture. The gesture may be detected by the computing device 102 in a variety of ways, such as using touchscreen functionality, one or more cameras, and so on. Further, although this functionality was described in relation to the collection portion 406, this functionality may also be employed elsewhere in the user interface 402, such as the portion 404 to navigate through the file system 402. In this way, a user may navigate through the file system 108 using the portion 404 and collect copies of representations in the collection portion 406 through various locations in the namespace employed by the computing device 102.

Figure 7:
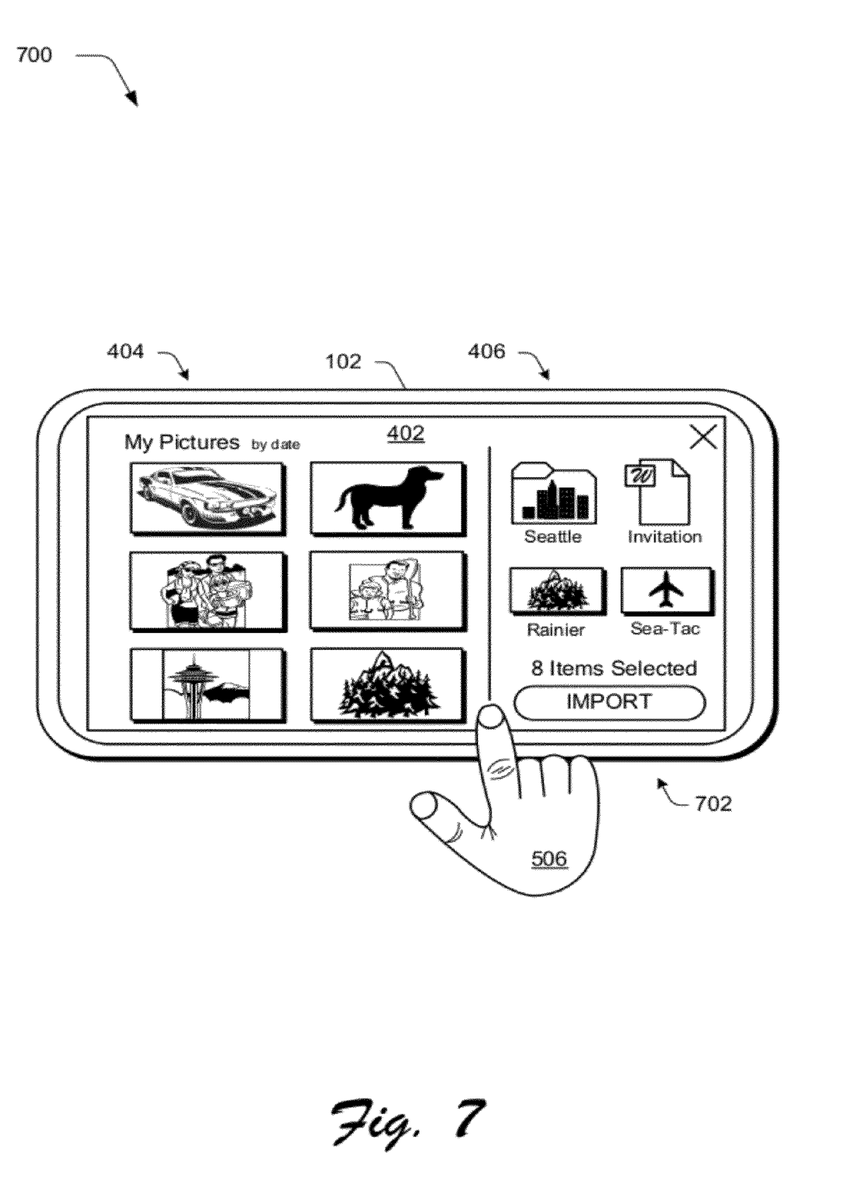
FIG. 7 depicts an example implementation in which dynamic information of the collection portion of a user interface is further updated as items are collected in the collection portion.

FIG. 7 depicts an example implementation 700 of the user interface 402 in which dynamic information of the collection portion 406 is further updated as items are collected in the collection portion 406. Continuing with the previous example, a user may navigate through the file system 108 to locate objects to be copied into the collection portion 406. Examples of objects copied to the collection portion 406 in the illustrated example files and folders, although other objects are also contemplated as described in relation to FIG. 3.

As illustrated, a number of objects have been copied to the collection portion 406 than can be shown at any one time using the current style of representations, i.e., thumbnails. Accordingly, dynamic information 702 may be used to describe the number of objects included. In an implementation, a pan gesture may be input using the user's hand 506 to scroll through the representations in the collection portion to view each one, if desired. As previously stated, an option may then be selected to cause an operation to be performed using the represented objects, further discussion of which may be found in relation to the following procedures.

Example Procedures

The following discussion describes file management techniques that may be implemented utilizing the previously described systems and devices. Aspects of each of the procedures may be implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference will be made to the environment 100 of FIG. 1 and the user interfaces 200-700 of FIGS. 2-7.

Figure 8:
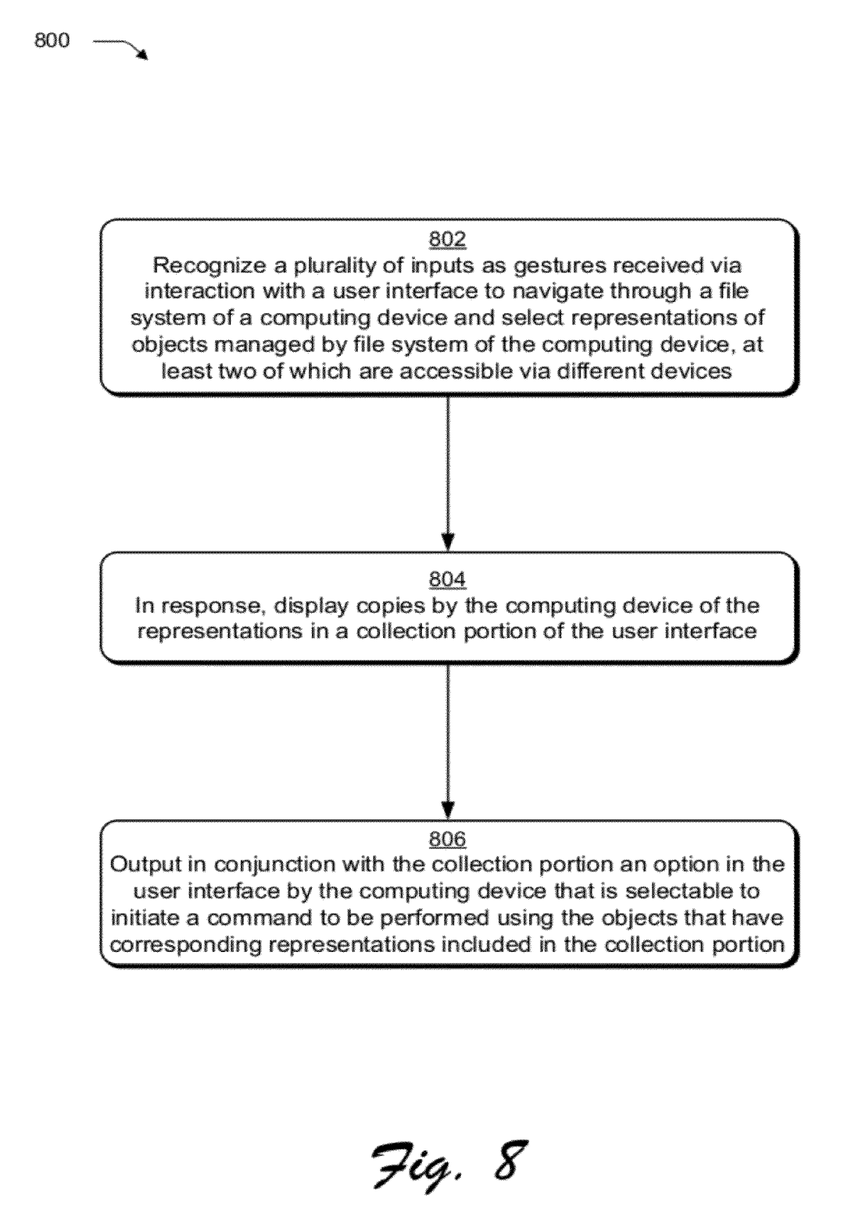
FIG. 8 is a flow diagram depicting a procedure in an example implementation in which navigation through a file system is performed to collect copies of representations of objects in a collection portion of a user interface.

FIG. 8 depicts a procedure 800 in an example implementation in which navigation through a file system is performed to collect copies of representations of objects in a collection portion of a user interface. A plurality of inputs is recognized as gestures received via interaction with a user interface. The gestures are configured to cause navigation through a file system of a computing device and select representations of objects managed by file system of the computing device, at least two of which are accessible via different devices (block 802). The computing device 102, for instance, may detect gestures using touchscreen functionality, capture using a camera, and so on. As described in relation to FIG. 3, the objects may involve a variety of different devices in the file system, such as storage devices, peripheral device, networked computing devices, and so on.

In response to this recognition, copies of the representations are displayed by the computing device in a collection portion of the user interface (block 804). In this example, a copy of the representation (e.g., Rainer in FIG. 5) is included in the collection portion 406 as well as the portion 404 used to navigate through the file system 108.

An option is output in conjunction with the portion in the user interface by the computing device, the option is selectable to initiate a command to be performed using the objects that have corresponding representations included in the collection portion (block 806). Continuing with the previous example, a variety of different options may be displayed to initiate commands using the represented objects, e.g., files, folders, and so on. The command, for instance, may involve access requested by the application 112 from the broker module 114, determined dynamically based on types of object included in the collection portion 406, and so on.

Figure 9:
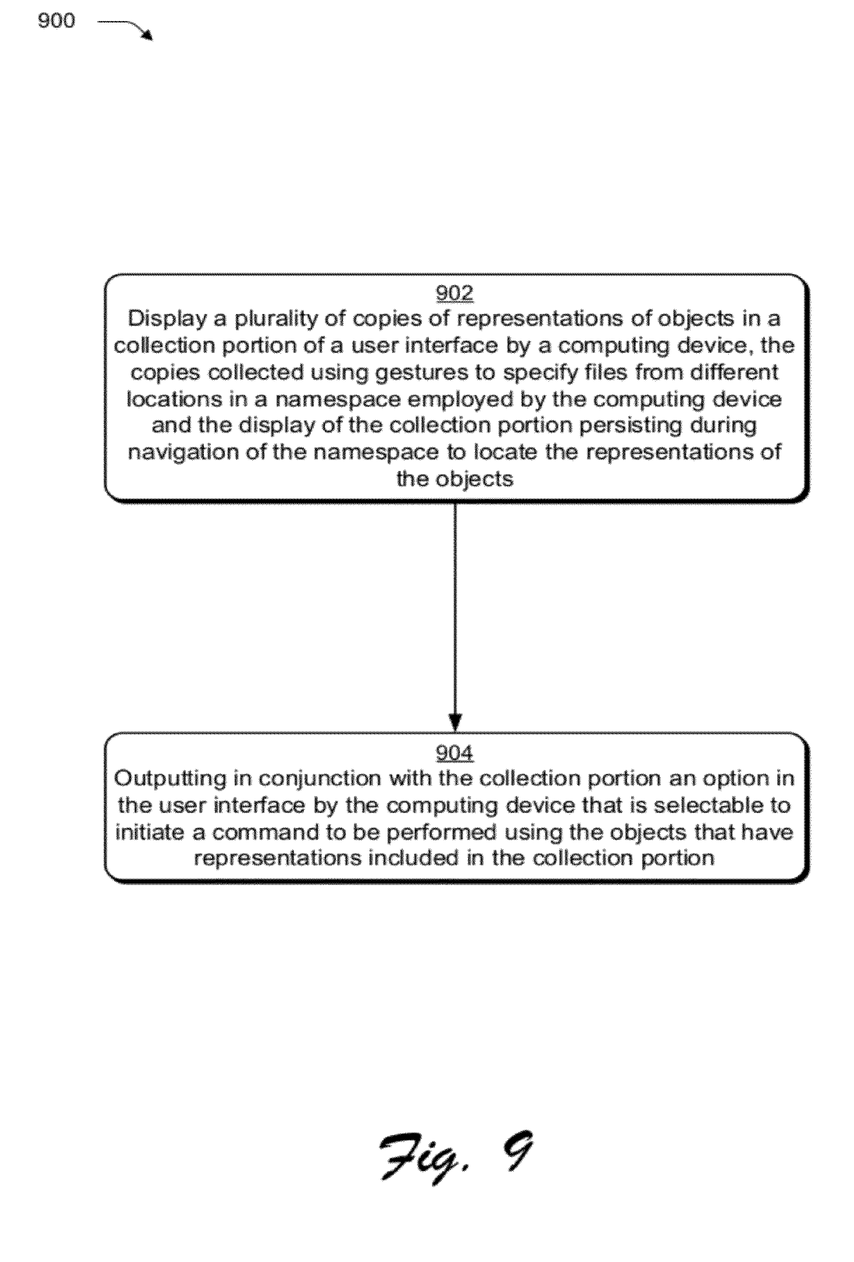
FIG. 9 is a flow diagram depicting a procedure in an example implementation in which display of a collection portion persists during navigation through a namespace to locate representations of objects to be copied to the collection portion.

FIG. 9 depicts a procedure 900 in an example implementation in which display of the collection portion persists during navigation through a namespace to locate representations of objects to be copied to the collection portion. A plurality of copies of representations of objects are displayed in a collection portion of a user interface by a computing device, the copies collected using gestures to specify objects from different locations in a namespace employed by the computing device, the display of the collection portion persisting during navigation of the namespace to locate the representations of the objects (block 902). A user, for instance, may interact with a portion 404 of a user interface 406 to navigate through objects accessible via different locations in a namespace. As desired objects are located, a user may "tap" the representations using a gesture to cause the representation to be copied over to the collection portion 406.

An option is output in conjunction with the collection portion in the user interface by the computing device that is selectable to initiate a command to be performed using the objects that have representations included in the collection portion (block 904). As described previously, a variety of different commands may be represented by the option, a single selection of which may be used to cause the command to be performed using objects represented in the collection portion 406.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method comprising:
    recognizing a plurality of inputs as gestures received via interaction with a user interface, the gestures being configured to:
        navigate through a file system of a computing device, the file system comprising objects that include a file or a folder, at least two of the objects are accessible via different devices; and
        select representations of the objects managed by the file system in a first portion of the user interface;
    in response to the selection of the representations of the objects in the first portion of the user interface, displaying copies of the selected representations of the objects in a collection portion of the user interface, the collection portion being different from the first portion; and
    outputting an option in the collection portion of the user interface that is selectable to initiate a command to be performed using the objects in the file system based on the copies of the selected representations of the objects being included in the collection portion.

2. A method as described in claim 1, further comprising outputting the user interface in response to receipt of a request from an application by one or more modules to access the file system.

3. A method as described in claim 2, wherein the application is prevented from direct access to the file system through interaction with the one or more modules.

4. A method as described in claim 2, wherein interaction with the one or more modules is configured such that the application is not aware of where in the file system the objects are being accessed.

5. A method as described in claim 2, wherein the option is configured to provide data of the objects that have corresponding copies of the selected representations of the objects included in the collection portion to the application.

6. A method as described in claim 1, wherein a first of the at least two objects is accessible via a local file system, a peripheral device communicatively coupled to the computing device, or another computing device that is accessible to the computing device over a network and a second of the at least two objects is accessible via a different one of the local file system, the peripheral device communicatively coupled to the computing device, or the other computing device that is accessible to the computing device over the network.

7. A method as described in claim 1, wherein the displaying is performed such that display of the collection portion persists during the selection of the representations of the objects in the first portion of the user interface and as the navigation through the file system is performed.

8. A method as described in claim 1, wherein the file system is part of an operating system that executes on the computing device to perform the recognizing, the displaying and the outputting.

9. A method as described in claim 1, wherein the file system employs a namespace.

10. A method as described in claim 1, wherein at least one of the gestures to select representations of the objects involves a tap of the representations of the objects, which causes the copies of the selected representations of the objects to be displayed in the collection portion.

11. A method as described in claim 1, wherein the user interface of the computing device supports a gesture to remove a corresponding said copy of the representation from the collection portion.

12. A method as described in claim 1, wherein the user interface of the computing device is configured to change a display characteristic of a representation of the object selected to be copied to the collection portion in response to the selection.

13. A method as described in claim 1, wherein the collection portion of the user interface of the computing device is configured to display data that describes a current state of the collection portion.

14. A method as described in claim 1, wherein the collection portion of the user interface of the computing device is configured to display properties of a corresponding said object in response to a gesture that indicates selection of the copy of the representation of the object in the collection portion.

15. A method comprising:
displaying a plurality of copies of representations of objects in a collection portion of a user interface by a computing device, the plurality of copies collected for display using gestures to specify objects from different locations in a namespace employed by the computing device and the displaying of the collection portion persisting during navigation of the namespace to locate the representations of the objects; and
outputting, in the collection portion of the user interface, an option that is selectable to initiate a command to be performed using the objects that have copies of representations of objects included in the collection portion.

16. A method as described in claim 15, further comprising displaying the user interface in response to receipt of a request from an application to access the namespace, the application not being aware of the namespace.

17. A method as described in claim 16, wherein the user interface is configured to provide navigation through the namespace without enabling the application to access the namespace directly, the navigation configured to verify that access performed by a user through interaction with the user interface is to be granted to the application as requested.

18. A method comprising:
recognizing a first input as a first gesture to select a first representation of a first file displayed in a user interface by a computing device;
in response to the recognizing of the first gesture, displaying a copy of the first representation of the first file in a collection portion in the user interface;
recognizing a second input as a second gesture to select a second representation of a second file displayed in the user interface by the computing device, the first and second objects accessible via different locations in a namespace employed by the computing device;
in response to the recognizing of the second gesture, displaying a copy of the second representation of the second file in the collection portion in the user interface along with the copy of the first representation of the first file; and
outputting an option in the collection portion that is selectable to initiate a command to be performed using the first and second objects based on the copy of the first representation of the first file and the copy of the second representation of the second file being displayed in the collection portion.

19. A method as described in claim 18, further comprising outputting the user interface in response to receipt of a request from an application to access the namespace, the application not being aware of the namespace.

20. A method as described in claim 19, wherein the user interface is configured to provide navigation through the namespace without enabling the application to access the namespace directly, the navigation configured to verify that access performed by a user through interaction with the user interface is to be granted to the application as requested.

* * * * *